United States Patent [19]

Moffre et al.

[11] Patent Number: 5,497,732
[45] Date of Patent: Mar. 12, 1996

[54] PORTABLE DOG RUN

[76] Inventors: Patrick Moffre, 64 Longwood Dr., Clifton Park, N.Y. 12065; Douglas Schreiber, 7 Newton Rd., Latham, N.Y. 12110

[21] Appl. No.: 263,194

[22] Filed: Jun. 21, 1994

[51] Int. Cl.[6] ............................................. A01K 27/00
[52] U.S. Cl. ............................................................ 119/784
[58] Field of Search ................................. 119/784, 794, 119/796

[56] References Cited

U.S. PATENT DOCUMENTS

| | | |
|---|---|---|
| 1,233,649 | 7/1917 | Czaja et al. . |
| 3,123,052 | 3/1964 | Marshall ................................. 119/789 |
| 3,203,399 | 8/1965 | Banks . |
| 3,395,675 | 9/1966 | Fowlkes . |
| 3,678,903 | 7/1972 | Ferraro . |
| 3,722,478 | 3/1973 | Smith . |
| 3,853,283 | 12/1974 | Croce et al. ........................ 119/796 X |
| 3,937,418 | 2/1976 | Critelli ................................. 119/796 X |
| 4,197,817 | 4/1980 | Crutchfield .............................. 119/794 |
| 4,232,630 | 11/1980 | Orlowski et al. . |
| 4,656,967 | 4/1987 | Duksa . |
| 4,762,089 | 8/1988 | McNulty ................................. 119/796 |

FOREIGN PATENT DOCUMENTS

| | | | |
|---|---|---|---|
| 1063551 | 5/1954 | France ................................... 119/796 |
| 2818222 | 5/1979 | Germany ............................... 119/796 |

*Primary Examiner*—Thomas Price
*Attorney, Agent, or Firm*—Schmeiser, Olsen & Watts

[57] ABSTRACT

The invention is a portable dog run which effectively exercises a dog or other animal. A cable, wound around a spool, provides an overhead linear guideway when extended. Also, a spool lock is provided to affix the cable at a predetermined length. The spool and extended cable connect to various fixtures by using swivel snaps and eyebolts, or other similar connectors. Adjustable straps are provided to connect the dog run to structures which do not accommodate eyebolts, hence enhancing the portability.

8 Claims, 1 Drawing Sheet

PORTABLE DOG RUN

FIELD OF THE INVENTION

The present invention relates generally to devices employed to exercise animals. More specifically, this invention relates to devices employing a portable, retractable assembly for restraining a dog to a path of travel defined by a suspended cable.

BACKGROUND OF THE INVENTION

There have been many devices used for exercising animals.

U.S. Pat. No. 4,656,967 discloses a device for automatically exercising dogs by using an endless belt, pulleys and two support posts. The endless belt is suspended between an idler pulley and a drive pulley to provide a belt drive which is parallel to the guideway.

U.S. Pat. No. 3,203,399 shows a carriage device which is movable along a ground track. The ground track is a flat bottom plate with a stop or bumper. An anchoring element is used to fix the track in place.

U.S. Pat. No. 4,232,630 discloses a carriage and an overhead pulley for straight line exercising. The device is installed between two posts. The carriage which attaches to an animal and an endless belt which moves the carriage in a substantially straight line, the direction of travel of the carriage being reversed at each end of the line of travel.

U.S. Pat. No. 3,722,478 shows rigid link members used for prevention of knotting and wrapping in tethers. A stationary post is shown to which the tethered animal is fastened.

U.S. Pat. No. 3,678,903 discloses a stationary retaining block which mounts an endless cable, confining the associated animal to a limited area. The guide assembly employs a plurality of stationery retaining blocks to provide a mount for an endless cable. A traveler member forms a slot so that the traveler member passes through the retaining blocks and traverses a path for restraining the movement of the associated animal to a limited area.

U.S. Pat. No. 3,395,675 is a tethering device for free movement with a rigid rod. The tethering device includes a solid elongate member to be connected adjacent to the collar of a dog so the dog will not be able to choke himself.

U.S. Pat. No. 1,233,649 shows a vertical post with an extended arm for circular exercising. The arm contains rollers, vertical rods and circular base, allowing the animal a certain range of freedom.

Each of these aforementioned devices, once installed, are basically permanent fixtures and are not intended for use as a portable exerciser. The more portable devices, such as leashes, greatly diminish the area allowed for exercising. This creates a problem for the animal owner who frequents a variety of locations, such as with camping or traveling, and desires a suitable exerciser for their animal. It would be a burden to carry and continually reinstall the heavy or awkward equipment previously needed for such an animal exerciser.

The above prior art summaries are merely representative of portions of the inventions disclosed in each reference. In no instance should these summaries substitute for a through reading of each individual reference.

SUMMARY OF THE INVENTION

The present invention is a dog run which not only effectively exercises a dog or other animal, but is also very lightweight and compact and thus, portable.

A cable, wound around a spool, extends and retracts from the spool to provide an overhead linear guideway for an animal. A spool lock is provided to affix the cable at a predetermined length. When the spool lock is in an unlocked position, the cable is extended and the spool and extended cable are connected to various fixtures by using swivel snaps and eyebolts, or other similar connectors. The cable is then brought to a taut configuration and the spool is placed in a locked position, thus fixing the cable at a determined length. When taking the apparatus down, the procedure is reversed, that is, the spool is unlocked, the cable slackened, the spool and cable are disconnected and the cable is retracted back into the spool.

Several features of this invention include means by which the swivel snaps located on the apparatus can be connected to structures which do not accommodate eyebolts. These features, including adjustable straps, enhance the portability of the dog run by allowing the apparatus to be connected to trees, poles or similar structures.

Another feature includes a pole unit when there is no other existing structure.

Further objects and features of this invention will become more apparent by reference to the following description, taken in conjunction with the accompanying figures.

DETAILED DESCRIPTION OF THE INVENTION

Figure 1:
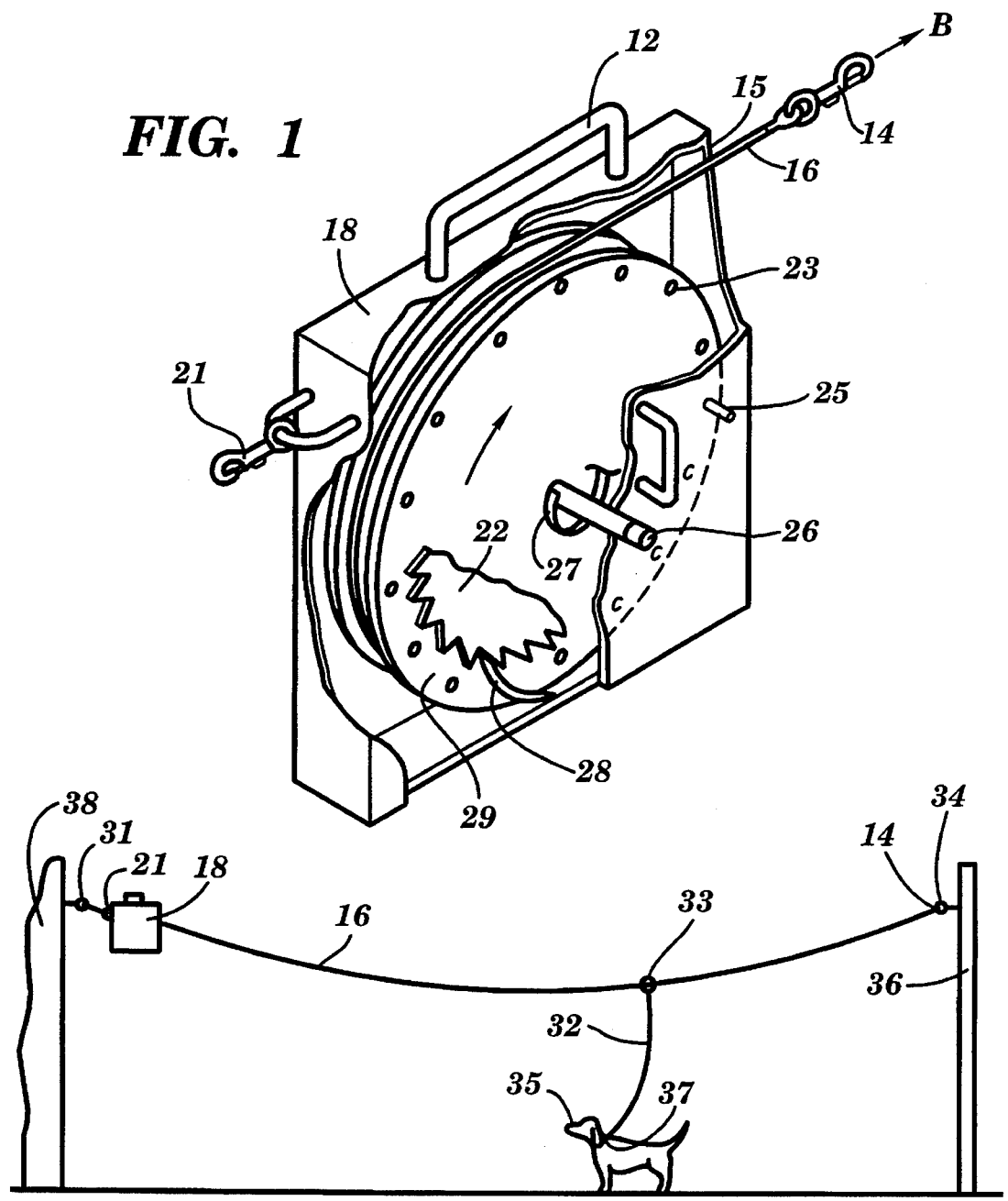
FIG. 1 is a side view, partly broken away, of the apparatus in accordance with the present invention.

Referring now to the drawings in greater detail, wherein like numerals represent like parts, FIG. 1 shows a portable dog run spool unit 18. The spool unit may be made of a lightweight material, such as plastic, for greater portability, and in preferred form, the approximate size of the unit should be no greater than 12"×12"×4". The unit is equipped with a stationary handle 12 and crank handle 26 for conveying the unit to its various sites. A connector 21, such as a open eye swivel snap, is located on the spool unit.

A spool 29 is housed inside the spool unit 18. On the spool is a locking mechanism 23 and 25 for locking the spool in one position. A pin 25 and pin slots 23 are shown in the illustration, but locking means such as a key and keyway, or, if one desires to prevent the reversal of the spool while unwinding a line or cable, a pawl and ratchet 26 may also be used.

An elongate member 16 is wound about the spool. In the preferred embodiment, the elongate member is a 100 foot cable, but as one of ordinary skill in the art can appreciate, any flexible elongate member, such as rope, line, chain, wire, etc. of any desired length would also be suitable. A coiled spring 27 allows the elongate member 16 to easily retract into the spool after being extended. A spool handle (not pictured) may also be used in place of the coiled spring.

While one end of the elongate member 16 is attached to the spool 29, the other end is attached to a connector 14. Connector 14 is located opposite of the connector 21 on the spool unit. Both connectors 14 and 21 are shown as swivel open eye spring snaps, but are not limited to such. Swivel snap 21 is connected to a ring that is attached to the spool unit.

The elongate member 16 extends through an opening 15 in the spool unit 18.

Figures 2, 3, 4, 5:
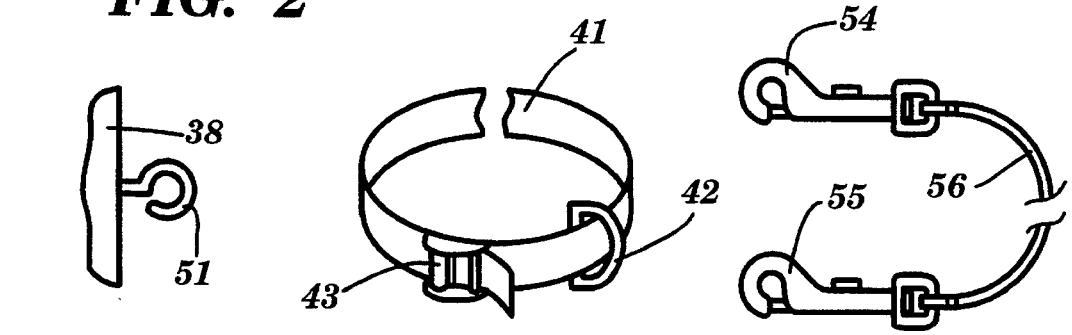
FIG. 2 is the perspective view of FIG. 1 with the cable extended and dog attached thereto.
FIG. 3 is an enlarged view of a connector used in FIG. 2.
FIG. 4 is an enlarged view of a variation of the connector used in FIG. 2.
FIG. 5 is an enlarged view of a further variation of the connector used in FIG. 2.

In operation, the spool unit 18 is connected to a structure 38 through connectors 21 and 31 as shown in FIG. 2. The elongate member is then extended from the spool while the locking mechanism is in an unlocked position. The elongate member extends in direction B as the spool rotates in direction A (FIG. 1).

Elongate member 16 is then attached to another structure, such as a fence post 36 with an eyebolt 34, through connector 14. The elongate member is brought into a taut configuration, either through the coiled spring, or the spool handle.

The spool is then placed in a locked position. An animal leash 32 attaches to the elongate member by a 100 p or clip 33 so that an animal 35 will have a limited range of movement between the structures when the animal 35 is connected to an animal leash attachment loop or clip 37.

One important aspect of the invention is the variety of connectors which allow for the flexibility of what constitutes a structure. Structures 38 and 36 may easily be a tree as well as a house, a pole, and similar structures. Three such connectors used for connector sites 31 and 34 are shown in FIGS. 3, 4, and 5.

The typical connector used for a pole, house, or camper is shown in FIG. 3. An eyebolt 51 is screwed into structure 38. The swivel snap on the spool unit or elongate member then connects to the eyebolt 51.

Another connector as shown in FIG. 4 may be used in attaching the portable dog run to a tree or similar structures. A ring 42 encircles an adjustable lashing type strap 41. The strap 41 is adjusted by an adjustor 43 so that the strap is securely fastened around the desired structure. The strap may be approximately 12 feet to accommodate most structures. The swivel snap on the spool unit or elongate member then connects to the ring 42.

FIG. 5 illustrates a connector which may be used as a sling-type connector. A line 56 ends in two swivel open eye spring snaps 54 and 55. The line may be cable, rope, chain, wire or similar to such. The line 56 may fasten around a limb of a tree whereas connectors 54 and 55 then connect to the swivel snap on the spool unit or the elongate member.

When no structures are available, a portable pole unit 36 such as shown in FIG. 2 may be used. The pole unit 36 may be a 2½" galvanized standard fence post with a standard 5/16×6 screw eyebolt 34. The pole unit may also be detachable in 1 to 4 areas, such as a tent pole, to be made more compact while traveling.

While a preferred embodiment of the foregoing invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A portable apparatus for exercising animals comprising:

a spool unit with a rotatable spool located within said spool unit;

a flexible elongate member, wrapped about said spool, said elongate member extends from said spool unit for use as an animal exerciser and retracts into said spool unit for portability;

a first end of said flexible elongate member attached to said spool and a second end of said flexible elongate member attached to a first connector means for releasably attaching said flexible elongate member to a first structure when extended from said spool unit;

a quick release connector means attached to said spool unit, for releasably attaching said spool unit to a second structure; and a leash having a first leash connector means located at one end of the leash for slidably attaching to said flexible elongate member in a manner to allow the one end of the leash to slide along a longitudinal axis of said flexible elongate member while both the first connector means and the quick release connector means are attached to the first and second structures respectively, said leash having a second leash connector means located at another end of the leash for attaching an animal thereto.

2. The apparatus of claim 1 wherein said means for locking comprises a locking pin and pin slots.

3. The apparatus of claim 1 further comprising means, on said spool and said spool unit, for locking said flexible elongate member at a designated length, said means for locking comprises a ratchet and pawl.

4. The apparatus of claim 1 wherein said elongate member is a cable.

5. The apparatus of claim 1 wherein said first connector is a swivel snap.

6. The apparatus of claim 1 wherein said first connector is an adjustable strap with a steel ring and swivel snap.

7. The apparatus of claim 5 wherein said first connector is a cable with swivel snaps on both ends of said cable.

8. The apparatus of claim 1 further comprising a spool handle on said spool for extending and retracting said elongate member from said spool.

* * * * *